United States Patent
Maleki et al.

(10) Patent No.: US 6,487,233 B2
(45) Date of Patent: Nov. 26, 2002

(54) FIBER-COUPLED MICROSPHERE LASER

(75) Inventors: Lutfollah Maleki, Pasadena, CA (US); Xiaotian S. Yao, Diamond Bar, CA (US); Vladimir Ilchenko, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 8 days.

(21) Appl. No.: 09/792,386

(22) Filed: Feb. 23, 2001

(65) Prior Publication Data

US 2001/0038651 A1 Nov. 8, 2001

Related U.S. Application Data

(60) Provisional application No. 60/184,730, filed on Feb. 23, 2000.

(51) Int. Cl.⁷ .................................................. H01S 3/08
(52) U.S. Cl. ........................... 372/108; 372/6; 372/92; 372/66; 372/9; 372/57; 385/28
(58) Field of Search ................ 372/108, 6, 9, 372/92, 66, 67, 94; 385/28, 27

(56) References Cited

U.S. PATENT DOCUMENTS

| | | | |
|---|---|---|---|
| 4,829,537 A | | 5/1989 | Baer |
| 5,343,490 A | * | 8/1994 | McCall ......................... 372/92 |
| 5,398,256 A | * | 3/1995 | Hohimer et al. ............... 372/94 |
| 5,684,815 A | | 11/1997 | Miura et al. |
| 5,742,633 A | * | 4/1998 | Stone et al. ................... 372/92 |
| 5,926,496 A | * | 7/1999 | Ho et al. ....................... 372/92 |
| 6,009,115 A | * | 12/1999 | Ho ................................ 372/92 |
| 6,259,717 B1 | * | 7/2001 | Stone et al. ................... 372/92 |
| 2001/0004411 A1 | * | 6/2001 | Yariv ............................. 385/28 |
| 2001/0033587 A1 | * | 10/2001 | Painter et al. .................. 372/6 |
| 2001/0038651 A1 | * | 11/2001 | Maleki et al. .................. 372/6 |
| 2002/0018611 A1 | * | 2/2002 | Maleki et al. ................. 372/92 |
| 2002/0018617 A1 | * | 2/2002 | Iitchenko et al. .............. 385/28 |
| 2002/0039470 A1 | * | 4/2002 | Braun et al. ................... 385/27 |

OTHER PUBLICATIONS

Laine et al. "Etch–eroded fiber coupler for whispering–gallery–mode excitation in high–Q silica microspheres." *IEEE Photonics Tech Letters* (1999): 1429–1430.

Little et al. "Analytic theory of coupling from tapered fibers and half–blocks into microsphere resonators." *IEEE Journal of Lightwave Technology* (1999): 704–715.

Griffel et al. "Fiber coupling of DFB laser to micro spherical cavities—a novel approach for frequency control and linewidth quenching utilizing morphology dependent resonances." *IEEE Lasers and Electro–Optics Society Annual Meeting* (1995): 296–297.

* cited by examiner

Primary Examiner—Leon Scott, Jr.
(74) Attorney, Agent, or Firm—Fish & Richardson P.C.

(57) ABSTRACT

A fiber-coupled laser based on a whispering-gallery-mode resonator formed of a laser gain medium and an angle-polished fiber coupler.

15 Claims, 4 Drawing Sheets

FIBER-COUPLED MICROSPHERE LASER

This application claims the benefit of U.S. Provisional Application No. 60/184,730, filed on Feb. 23, 2000.

ORIGIN OF THE DISCLOSURE

The systems and techniques described herein were made in the performance of work under a NASA contract, and are subject to the provisions of Public Law 96-517 (35 USC 202) in which the Contractor has elected to retain title.

BACKGROUND

This application relates to lasers, and more specifically, to optically-pumped lasers.

A laser generally includes an optical resonator, an active laser medium in the optical resonator, and a pump source. The active laser medium is selected to absorb the energy from the pump source and to produce an optical gain at a laser wavelength. The laser is optically pumped when the pump source is a laser or other light source. The resonator is used to direct the optical energy at the laser wavelength to repetitively pass through the active laser medium to be amplified and stored in one or more resonator modes. When the optical gain exceeds the total optical loss in the resonator, the laser oscillation occurs and the optical energy at the laser wavelength can be coupled out of the resonator as a laser output beam.

SUMMARY

The present disclosure includes a laser that uses a whispering-gallery-mode microsphere as the laser resonator and the active laser medium. The microsphere is formed of a material that is doped to produce the desired optical gain for laser action at a laser wavelength. An angle-polished fiber coupler is implemented to couple an optical fiber to the microsphere so that a pump beam at a pump wavelength from a pump light source can be delivered through the optical fiber to the microsphere and coupled into a whispering gallery mode at the pump wavelength in the microsphere. In addition, the angle-polished fiber coupler is also used to couple the laser beam in a whispering gallery mode out of the microsphere and into the optical fiber.

DETAILED DESCRIPTION

A dielectric sphere may be used to form a whispering-gallery-mode resonator which supports a special set of resonator modes known as "whispering gallery modes". These modes represent optical fields confined in an interior region close to the surface of the sphere around its equator due to the internal reflection at the sphere boundary.

Microspheres with a diameter on the order of 10 microns or larger have a resonator dimension much larger than the wavelength of light. The optical loss due to the finite curvature of the resonator, therefore, may be negligible. Hence, optical energy, once coupled into a whispering gallery mode, will circulate at the sphere equator and will be attenuated only by the optical loss due to optical absorption or optical scattering due to the inhomogeneity of the sphere (e.g., irregularities on the sphere surface). As a result, a high quality factor, Q, may be achieved in this resonator. Some microspheres with sub-millimeter dimensions have been demonstrated to exhibit very high quality factors for light waves, exceeding 109 for quartz microspheres. Such high Q values may be used to concentrate strong optical fields in the whispering gallery modes.

A microsphere made of a laser-active material, with an efficient optical pumping scheme, can be configured as a miniature solid-state microsphere laser. Because of the small volume and high Q of whispering-gallery modes, such a microsphere laser can combine very low threshold and narrow emission linewidth.

Figure 1:
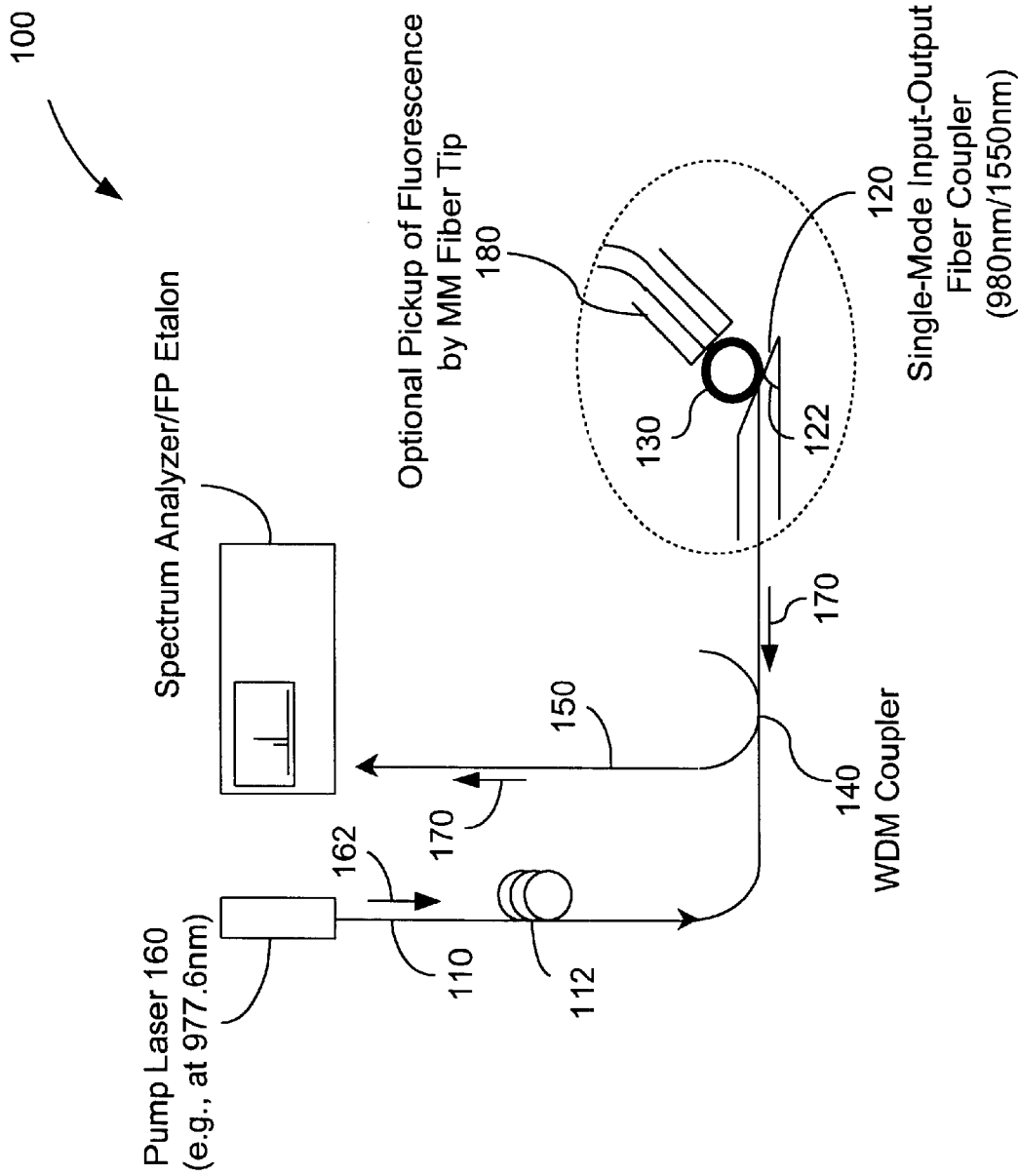
FIG. 1 shows one embodiment of a microsphere laser using an angle-polished fiber coupler for both pump coupling and laser output.

FIG. 1 shows a microsphere laser 100 based on a doped microsphere 130 according to one embodiment. The microsphere 130 is formed of a dielectric material and is doped with active ions such as rare earth ions to produce an optical gain at a selected laser wavelength under optical pumping at a different pump wavelength. For example, the pump wavelength may be near 0.98 micron, the doped microsphere 130 may absorb the pump light and to produce light at the laser wavelength near 1.55 micron in the transmission window of silica fibers. When the pump power coupled into the microsphere 130 is above a threshold level, the optical gain at the laser wavelength exceeds the optical loss and hence the laser oscillation is generated in the microsphere 130.

A single-mode angle-polished fiber coupler 120 is implemented to couple both pump light 162 into the microsphere 130 and the laser beam out of the microsphere 130 to produce an output laser beam 170. A single-mode fiber 110 is connected to the fiber coupler 120 to transport the pump light 162 to the microsphere 130 and to output the output laser beam 170. The fiber coupler 120 may be directly fabricated at one end facet of the fiber 110 or fabricated on a separate fiber which is connected to the fiber 110. The refractive index of the fiber coupler 120 is greater than that of the microsphere 130. The end facet of the fiber coupler 120 forms an angle 122 with respect to the fiber so that the guided light in the fiber coupler 120 is totally reflected back by the end facet. This angle is generally a function of the ratio of indices of the fiber coupler 120 and the microsphere 130. V. S.

Ilchenko, X. S. Yao, L. Maleki, Opt. Lett, Vol. 24, 723(1999). The fiber coupler 120 is positioned near the microsphere 130 by a spacing less than both the pump wavelength and the laser wavelength so that optical energy at either the pump wavelength or the laser wavelength can be coupled between the fiber 110 and the microsphere 130 through their respective evanescent fields.

Notably, the angle of the end facet of the fiber coupler 120 is selected to synchronize the following mode matching conditions. First, the fiber coupler 120 matches the mode of the pump light 162 guided by the fiber 110 to a pump whispering gallery mode at the pump wavelength in the microsphere 130. In the configuration illustrated in FIG. 1, the matched pump whispering gallery mode will travel around the sphere equator in the counter clockwise direction. Secondly, the fiber coupler 120 matches at least one laser whispering gallery mode at the laser wavelength to a guided mode at the laser wavelength in the fiber 110 so that the output laser beam 170 can be transmitted in the fiber 110. When the chromatic dispersion in the microsphere 130 does not significantly alter the synchronism condition at differing wavelengths, both pumping and lasing whispering-gallery modes that are simultaneously matched to the coupler 120, will occupy roughly the same volume inside the microsphere 130. This spatial overlap promotes efficient energy conversion from the pump light to the laser emission. In addition, this pumping scheme using whispering-gallery mode as opposed to standard end-pumped solid-state lasers, allows efficient pumping even with low-level doping material as the light is re-circulated in the volume of whispering-gallery mode until it is completely absorbed by the gain medium.

Two counter propagating laser whispering gallery modes may be generated in the microsphere 130. The fiber coupler 120, when positioned as illustrated in FIG. 1, couples the clockwise laser mode as the output laser beam 170. To increase the output coupling efficiency for the laser radiation by converting the pump light 162 into the output laser beam 170, the counter-clockwise laser mode may be suppressed. This would essentially make all pump energy coupled into the microsphere 130 available fro generating the output laser beam 170.

It is contemplated that a special optical diode mechanism may be integrated to the microsphere 130 to permit the laser oscillation only in one direction circulating the sphere's equator. The dielectric material for the microsphere 130 may be made to exhibit the gyromagnetic effect and is doped with laser-active ions. Under appropriate magnetization, nonreciprocity may be achieved for clockwise and counter-clockwise whispering-gallery modes, such as unequal quality factor Q or unequal coupling. As a result, the laser action is obtained only in one selected direction around the microsphere 130. The appropriate magnetization may be achieved by either using a magnetic device near the microsphere to produce an external magnetic field at the microsphere 130 or using the magnetization of the material itself. Alternatively, traveling-wave regime can be implemented using non-reciprocal coupler elements.

The laser 100 uses a light source 160 such as a diode laser to produce the pump light 162. A fiber polarization controller 112 may be used in the fiber 110 to control the polarization of the pump light at a desired direction. A wavelength-selective fiber coupler 140 may be coupled to the fiber 110 to extract the output laser beam 170 out of the fiber 110 to an output fiber 150 without coupling the light at the pump wavelength. Hence, the output laser beam 170 can be conveniently delivered through the fiber 150 to a fiber system or another fiber device. In addition, an optical fiber 180, e.g., a multi-mode fiber, may be placed at or near the surface of the microsphere 130 to receive fluorescence light for diagnosis purposes.

Figure 2:
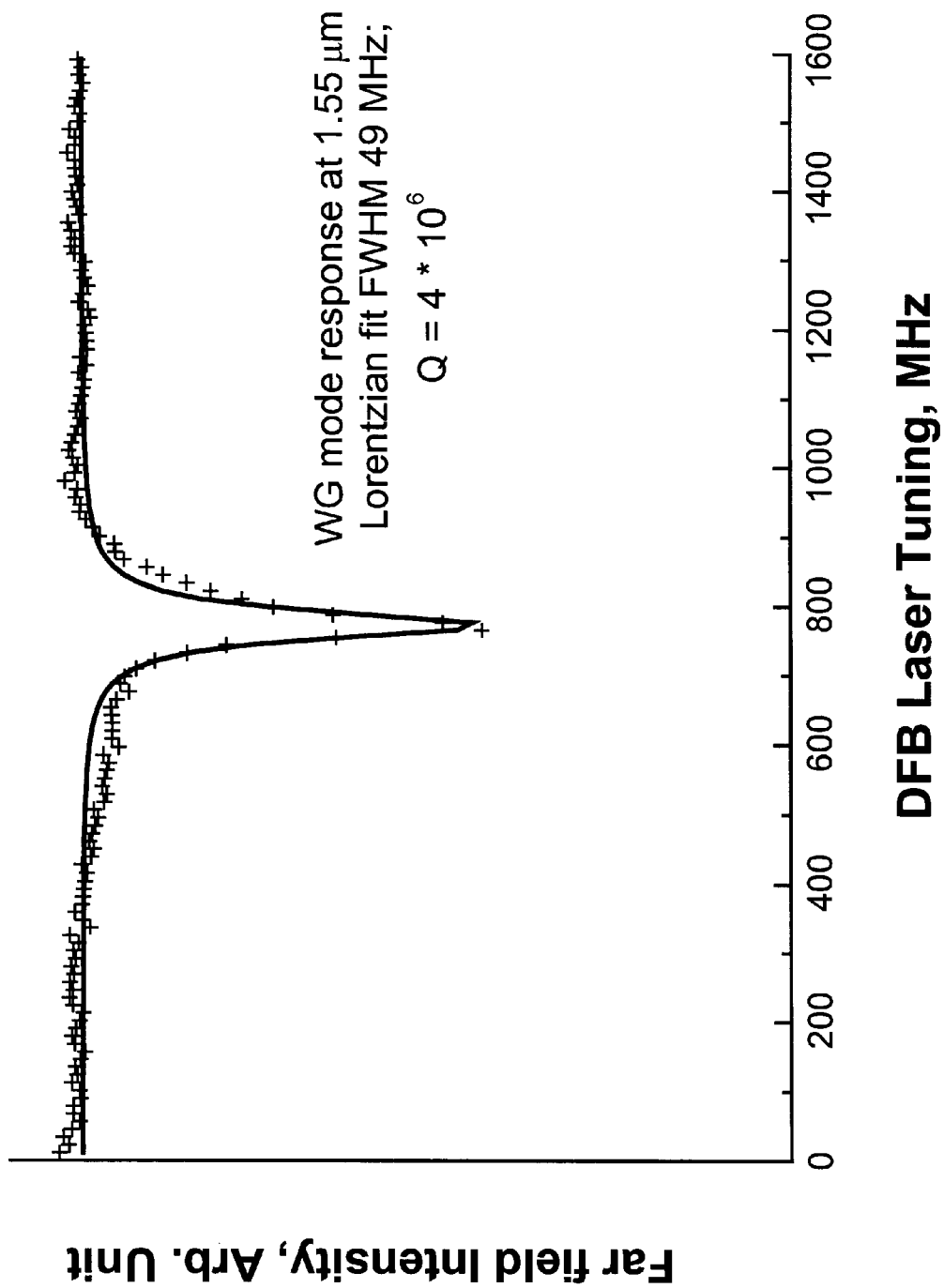
FIG. 2 shows the measured far-field intensity distribution as a function of the frequency detuning of the pump laser for one implementation of the laser in FIG. 1.
Figure 3:
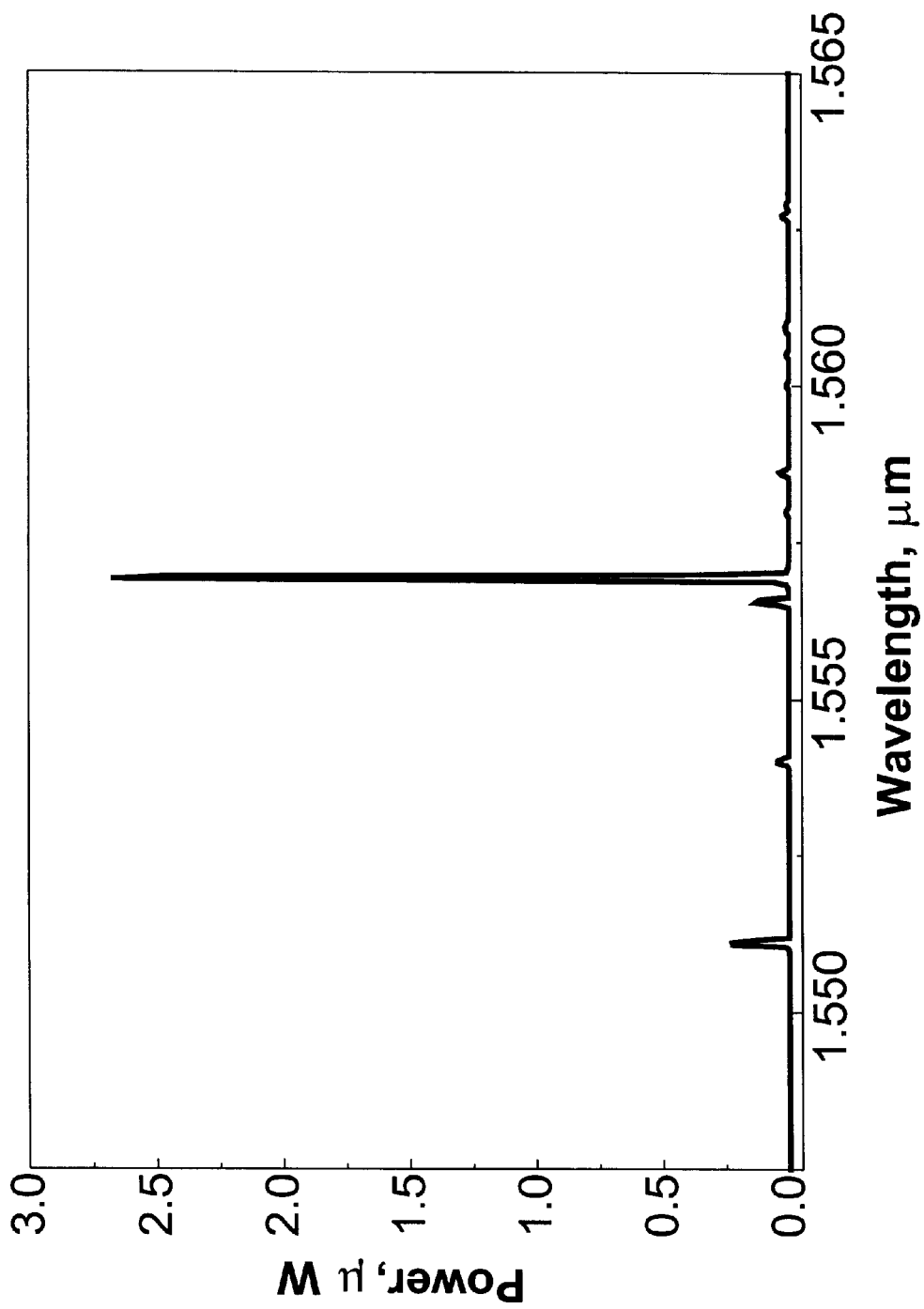
FIG. 3 shows the laser spectrum measured from the laser used in FIG. 2.
Figure 4:
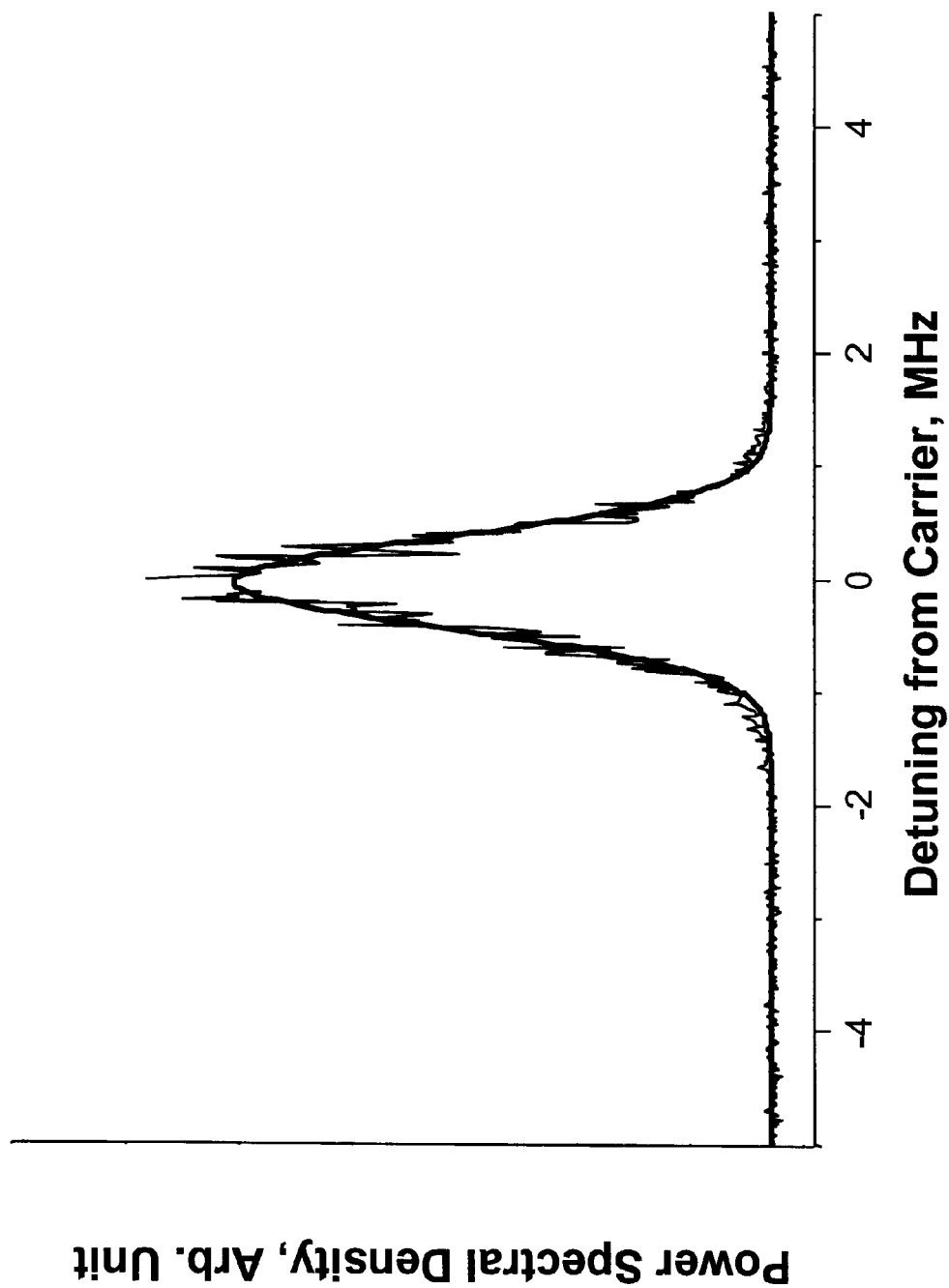
FIG. 4 shows the autocorrelation power spectrum of the output laser beam from the laser used in FIG. 2.

FIGS. 2, 3, and 4 show measured signals of a prototype microsphere laser based on the design shown in FIG. 1. The pump light source 160 is a commercial multimode diode laser stabilized with an external fiber grating at the pump wavelength of 977.6 nm. The sphere is produced from a 0.6-mm rods of the core material extracted from silicate fiber preforms with an Er content at about 1300 ppm. After homogenization of the material, a sphere of diameter about 150microns is formed by microtorch fusion. The quality factor of whispering-gallery (WG) modes at the pumping wavelength is about $Qp=0.5\times10^6$, smaller than projected from reported material attenuation 2.8 dB/m at 980 nm ($QEr=1.5\times10^7$), likely due to residual optical inhomogeneities. The laser action can be obtained throughout the interval between 1530 nm and 1560nm. Depending on coupler alignment, the spectrum of laser oscillation may include one or several spectral components as indicated in FIG. 3. A single-wavelength oscillation can be obtained with pumping at TE, $TH_{11q}$ modes possessing minimal volume.

A Fabry-Perot etalon may be coupled to the output fiber 150 to analyze the output laser beam 170. This measurement confirms the single-frequency oscillation. The unloaded quality-factor at the lasing wavelength, measured by means of a frequency-tuned DFB laser at 1550 nm, was found to be $3.8\times10^6$. Self-homodyne linewidth measurements with a 12-km optical delay and a frequency offset of about 140 MHz show the emission linewidth ranging from 200 kHz up to 1.5 MHz that increases with the output power.

When the pump power of about 4.5 $\mu$W is fed into WG mode at 980 nm, the laser output in the fiber is about 4.1 $\mu$W. Because of the excessive scattering losses, the power absorbed by the laser medium is at least QEr/QP~20 times smaller, i.e about 220 $\mu$W. The lasing threshold corresponded to about 1 mW of the pump power coupled into the sphere and approximately an amount of 20 $\mu$W of the pump power was absorbed. Improved energy efficiency and narrower linewidth may be expected when higher Q, more uniform spheres are used.

Since the whispering gallery modes essentially exist near the equator of the sphere, the resonator 130 in FIG. 1 may not be necessarily a whole sphere but a portion of the sphere near the equator that is sufficiently large to support the whispering gallery modes. Hence, rings, disks and other geometries formed from a proper section of a sphere may be used.

Although the present disclosure only includes a few embodiments, it is understood that various modifications and enhancements may be made without departing from the following claims.

What is claimed is:

1. A device, comprising:
    a resonator formed of a laser gain medium in a shape of at least a portion of a sphere that includes an equator of said sphere, said laser gain medium operable to absorb light at a pump wavelength and to emit light at a laser wavelength, said resonator configured to support whispering gallery modes at both said pump wavelength and said laser wavelength; and
    an optical fiber configured to guide light at both said pump wavelength and said laser wavelength and to include an angle-polished facet that forms an angle with respect to said fiber, wherein said angle-polished facet positioned near said resonator to evanescently couple pump light at said pump wavelength in said optical fiber into a whispering gallery mode at said pump wavelength and to evanescently couple light in a whispering gallery mode at said laser wavelength into said optical fiber.

2. The device as in claim 1, further comprising an optical pump source coupled to said optical fiber to provide said pump light.

3. The device as in claim 2, where said optical pump source includes a laser.

4. The device as in claim 1, further comprising a wavelength-selective coupler coupled to said optical fiber to selectively couple light at said laser wavelength out of said optical fiber.

5. The device as in claim 1, wherein said laser gain material includes rare earth ions.

6. The device as in claim 1, wherein said laser gain material exhibits a gyromagnetic effect to allow said light in said whispering gallery mode at said laser wavelength to circulate in a single direction within said resonator.

7. A method, comprising:

using an angle-polished fiber coupler to evanescently couple a pump beam from a guided pump mode in said fiber coupler into a pump whispering gallery mode in a resonator formed from at least a portion of a sphere and of a laser gain medium that absorbs light at said pump beam to emit light at a laser wavelength;

maintaining said pump beam above a threshold level to generate a laser oscillation at said laser wavelength in said resonator in a laser whispering gallery mode that spatially overlaps with said pump beam in said pump whispering gallery mode; and coupling laser energy in said laser whispering gallery mode out of said resonator via an evanescent field into said angle-polished fiber coupler to produce an output laser beam.

8. The method as in claim 7, further comprising suppressing one of two counter-propagating laser whispering gallery modes.

9. The method as in claim 8, wherein said laser gain material is configured to exhibit a gyromagnetic effect to provide said suppressing.

10. The method as in claim 8, further comprising controlling a magnetic field in said resonator to effectuate said suppressing.

11. A device, comprising:

a resonator formed of a dielectric medium in a shape of at least a portion of a sphere that includes an equator of said sphere, said dielectric medium and doped with active ions to absorb light at a pump wavelength and to emit light at a laser wavelength, said resonator configured to support whispering gallery modes at both said pump wavelength and said laser wavelength;

means for selecting a whispering gallery mode at said laser wavelength in a single selected direction for amplification while suppressing a whispering gallery mode at said laser wavelength in a direction opposite to said single selected direction; and an optical fiber configured to guide light at both said pump wavelength and said laser wavelength and to include an angle-polished facet that forms an angle with respect to said fiber, wherein said angle-polished facet positioned near said resonator to evanescently couple pump light at said pump wavelength in said optical fiber into a whispering gallery mode at said pump wavelength and to evanescently couple light in said whispering gallery mode at said laser wavelength in said selected single direction into said optical fiber.

12. The device as in claim 11, wherein said dielectric medium is a type exhibiting a gyromagnetic effect and said means operates by controlling a magnetic field in said resonator based on aid gyromagnetic effect.

13. The device as in claim 11, further comprising an optical pump source coupled to said optical fiber to provide said pump light.

14. The device as in claim 13, where said optical pump source includes a laser.

15. The device as in claim 11, further comprising a wavelength-selective coupler coupled to said optical fiber to selectively couple light at said laser wavelength out of said optical fiber.

* * * * *